United States Patent
Nishimura

(10) Patent No.: US 8,294,435 B2
(45) Date of Patent: Oct. 23, 2012

(54) POWER SUPPLY APPARATUS SUPPLYING POWER STORED IN POWER STORAGE UNIT TO LOAD AND POWER SUPPLY SYSTEM INCLUDING POWER SUPPLY APPARATUS

(75) Inventor: Kazuhito Nishimura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 541 days.

(21) Appl. No.: 12/598,529

(22) PCT Filed: Mar. 31, 2008

(86) PCT No.: PCT/JP2008/056286
§ 371 (c)(1),
(2), (4) Date: Nov. 2, 2009

(87) PCT Pub. No.: WO2008/136231
PCT Pub. Date: Nov. 13, 2008

(65) Prior Publication Data
US 2010/0060252 A1    Mar. 11, 2010

(30) Foreign Application Priority Data
May 1, 2007 (JP) ................................. 2007-120890

(51) Int. Cl.
*G05F 1/613* (2006.01)
*G05F 1/40* (2006.01)
*H02M 7/00* (2006.01)

(52) U.S. Cl. ........... 323/225; 323/271; 323/282; 363/65

(58) Field of Classification Search .................. 323/222, 323/225, 229, 271, 272, 282, 284, 288; 363/65
See application file for complete search history.

(56) References Cited

U.S. PATENT DOCUMENTS

| | | | | |
|---|---|---|---|---|
| 6,198,262 B1 * | 3/2001 | Squibb et al. | ................. | 323/273 |
| 7,023,186 B2 * | 4/2006 | Yan | ............................... | 323/225 |
| 7,602,156 B2 * | 10/2009 | Weng et al. | .................... | 323/222 |
| 7,719,865 B2 * | 5/2010 | Iwata et al. | ..................... | 363/71 |
| 2006/0267561 A1 * | 11/2006 | Domb et al. | .................. | 323/222 |
| 2008/0278130 A1 * | 11/2008 | Ito | ................................ | 323/282 |

FOREIGN PATENT DOCUMENTS

JP        54-129725        9/1979

(Continued)

OTHER PUBLICATIONS

International Search Report for PCT/JP2008/056286 mailed, May 20, 2008.

*Primary Examiner* — Jessica Han
(74) *Attorney, Agent, or Firm* — Nixon & Vanderhye P.C.

(57) ABSTRACT

A power supply apparatus converting electric power stored in a first power storage unit into a prescribed voltage for supply to a load includes: a power storage unit-side terminal coupled to the first power storage unit; a second power storage unit; a load-side terminal coupled to the load; a converter unit for increasing output voltage of the first power storage unit to a first voltage and outputting the first voltage to the load-side terminal at a time of discharging of the first power storage unit; a step-up circuit for increasing the output voltage of the first power storage unit and supplying the increased voltage to the second power storage unit; and a backflow prevention circuit arranged between the second power storage unit and the load-side terminal to allow current to flow from the second power storage unit to the load-side terminal and block current flowing from the load-side terminal to the second power storage unit.

6 Claims, 2 Drawing Sheets

FOREIGN PATENT DOCUMENTS

| | | |
|---|---|---|
| JP | 6-98480 A | 4/1994 |
| JP | 2002-095180 | 3/2002 |
| JP | 2003-304644 | 10/2003 |
| JP | 2005-199739 | 7/2005 |
| JP | 2006-029142 | 2/2006 |
| JP | 2007-244109 | 9/2007 |

* cited by examiner

POWER SUPPLY APPARATUS SUPPLYING POWER STORED IN POWER STORAGE UNIT TO LOAD AND POWER SUPPLY SYSTEM INCLUDING POWER SUPPLY APPARATUS

This application is the U.S. national phase of International Application No. PCT/JP2008/056286, filed 31 Mar. 2008, which designated the U.S. and claims priority to Japanese Application No. 2007-120890, filed 1 May 2007, the entire contents of each of which are hereby incorporated by reference.

TECHNICAL FIELD

The present invention relates to a power supply apparatus, and more particularly to a power supply apparatus converting electric power stored in a power storage unit into a prescribed voltage for supply to a load and a power supply system including the power supply apparatus.

BACKGROUND ART

Photovoltaic power generators having a power storage function are useful as an apparatus for bringing electric equipment into operation at places where commercial electric power is not distributed. An example of compact photovoltaic power generators having a power storage function is an apparatus supplying electric power to garden lights used in residential gardens where electrical wiring is not installed, that is, an apparatus storing electric power of solar cells during the daytime and discharging and supplying electric power to the lights during the night.

FIG. 3 is a diagram showing a configuration of a conventional interconnection system for a photovoltaic power generation system having a power storage function.

Referring to FIG. 3, this interconnection system includes a solar battery 101, a storage battery 102, an alternating current (AC) load 103, and a power converter 104. In operation of the interconnection, power converter 104 outputs current to a commercial power system of AC (Alternating Current) 200V in place of AC load 103.

In such an interconnection system for a photovoltaic power generation system having a power storage function, electric power from solar battery 101 can be stored in storage battery 102 via power converter 104 during the daytime, even when the commercial power system is failed. On the other hand, during the night, power is discharged from storage battery 102 through power converter 104 so that power is supplied to AC load 103 at home. Since AC load 103 generally operates at AC 100V, power converter 104 in this case converts DC (Direct Current) voltage from the storage battery and the solar battery into AC 100V for output.

Here, in recent years, electric equipment that consumes much power, such as air conditioners and electromagnetic cookers, are increasing as AC load 103 desired to operate at a time of power failures in ordinary households. Such electric equipment that consumes much power may require large power particularly when being started. In such a case, in order for AC load 103 to be started stably, it is necessary to instantaneously supply large starting power from power converter 104 to AC load 103.

As a conventional technique that solves the similar problem as above, Japanese Patent Laying-Open No. 2006-29142 (Patent Document 1) discloses a vehicle engine start control apparatus as follows. Specifically, an engine start control apparatus for a vehicle installed with an engine generating driving force of the vehicle and an engine starting apparatus receiving power supply to start the engine includes first and second power storage apparatuses capable of supplying the stored power to the engine starting apparatus and a starting current control unit provided between the first and second power storage apparatuses and the engine starting apparatus to supply operating current for the engine starting apparatus by means of at least one of the first and second starting current from the first and second power storage apparatuses, respectively. The starting current control unit controls the proportion of the first and second starting current of the operating current, depending on a state of the vehicle at a time of engine start. Because of such a configuration, in a vehicle in which operating current can be supplied to the engine starting apparatus by both the first power storage apparatus (secondary battery) and the second power storage apparatus (capacitor), a proper balance of current supply from them can be attained depending on a vehicle state. Therefore, at a time of supplying operating current to the engine starting apparatus that consumes much power, an output voltage drop caused by excessive output current can be prevented in either power storage apparatus, thereby achieving smooth and stable vehicle operations.

Furthermore, Japanese Patent Laying-Open No. 2005-199739 (Patent Document 2) discloses voltage-dependent vehicle-mounted equipment as follows. Specifically, the voltage-dependent vehicle-mounted equipment is connected to an ACC (accessory) power supply of a vehicle and/or a battery, and a capacitor bank is connected to and charged by the ACC power supply and/or the battery to supply electric power to the voltage-dependent vehicle-mounted equipment when the electric power supplied to the voltage-dependent vehicle-mounted equipment becomes a prescribed value or lower. Because of such a configuration, it becomes possible to instantaneously supply electric power from the capacitor bank to the voltage-dependent vehicle-mounted equipment in response to a momentary power drop due to restarting of the engine of an idling stop vehicle. Therefore, it is possible to provide a voltage-dependent vehicle-mounted equipment immune to a momentary power drop and an environmentally-friendly automobile of good performance.

Patent Document 1: Japanese Patent Laying-Open No. 2006-29142

Patent Document 2: Japanese Patent Laying-Open No. 2005-199739

DISCLOSURE OF THE INVENTION

Problems to be Solved by the Invention

The configurations in Patent Documents 1 and 2, however, both relate to a system supplying output voltage of a storage battery to a load as it is without voltage conversion of increasing or decreasing voltage and cannot supply power to a load operating at a voltage higher than the output voltage of the storage battery. For example, in a case where equipment requiring AC 100V such as AC load 103 in FIG. 3 is operated, the output voltage of storage battery 102 need to be once increased by power converter 104 before DC to AC conversion.

In the configurations in Patent Documents 1 and 2 where the output voltage of the storage battery is used as it is in the load, when large power is requested from the load at a time of starting of the load, a drop of the output voltage of the storage battery can be prevented. However, with the configurations in Patent Documents 1 and 2, it is not possible to supply power to a load operating at a voltage higher than the output voltage of the storage battery.

An object of the present invention is therefore to provide a power supply apparatus capable of increasing output voltage of a power storage unit such as a storage battery for supply to a load and of stably supplying voltage to a load, and a power supply system including the power supply apparatus.

Means for Solving the Problems

A power supply apparatus in accordance with an aspect of the present invention converts electric power stored in a first power storage unit into a prescribed voltage for supply to a load. The power supply apparatus includes: a power storage unit-side terminal coupled to the first power storage unit; a second power storage unit; a load-side terminal coupled to the load; a converter unit for increasing output voltage of the first power storage unit to a first voltage and outputting the first voltage to the load-side terminal at a time of discharging of the first power storage unit; a step-up circuit for increasing output voltage of the first power storage unit and supplying the increased voltage to the second power storage unit; and a backflow prevention circuit arranged between the second power storage unit and the load-side terminal to allow current to flow from the second power storage unit to the load-side terminal and block current flowing from the load-side terminal to the second power storage unit.

Preferably, the step-up circuit increases output voltage of the first power storage unit and supplies the increased voltage to the second power storage unit such that output voltage of the second power storage unit is smaller than the first voltage.

Preferably, the backflow prevention circuit includes a diode having an anode coupled to the second power storage unit and a cathode coupled to the load-side terminal.

Preferably, the converter unit decreases voltage supplied from the load-side terminal and supplies the decreased voltage to the first power storage unit at a time of charging of the first power storage unit.

Preferably, the first power storage unit is a storage battery, and the second power storage unit is a capacitor.

In accordance with an aspect of the present invention, a power supply system supplying electric power to a load includes: a first power storage unit; a second power storage unit; a load-side terminal coupled to the load; a converter unit for increasing output voltage of the first power storage unit to a first voltage and outputting the first voltage to the load-side terminal at a time of discharging of the first power storage unit; a step-up circuit for increasing output voltage of the first power storage unit and supplying the increased voltage to the second power storage unit; and a backflow prevention circuit arranged between the second power storage unit and the load-side terminal to allow current to flow from the second power storage unit to the load-side terminal and block current flowing from the load-side terminal to the second power storage unit.

Effects of the Invention

In accordance with the present invention, it is possible to increase output voltage of a power storage unit such as a storage battery for supply to a load and to stably supply voltage to a load.

Figure 1:
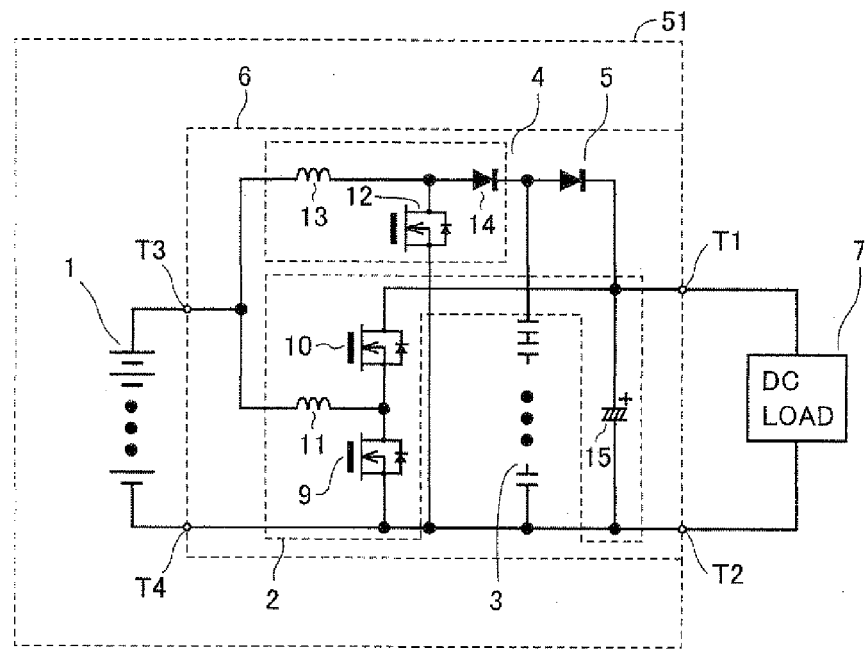
FIG. 1 is a diagram showing a configuration of a power supply system in accordance with an embodiment of the present invention.

DESCRIPTION OF THE REFERENCE SIGNS 1 storage battery (first power storage unit), 2 bidirectional DC-DC converter, 3 capacitor (second power storage unit), 4 step-up circuit, 5 diode (backflow prevention circuit), 6 power supply apparatus, 7 DC load, 9, 10, 12 switch element, 11, 13 reactor, 14 diode, 15 capacitor, 51 power supply system, 101 solar battery, 102 storage battery, 103 AC load, 104 power converter, T1, T2 load-side terminal, T3, T4 storage battery-side terminal.

BEST MODES FOR CARRYING OUT THE INVENTION

In the following, an embodiment of the present invention will be described using the drawings. It is noted that in the figures the same or corresponding parts are denoted with the same reference numerals and a description thereof will not be repeated.

[Configuration and Basic Operation]

FIG. 1 is a diagram showing a configuration of a power supply system in accordance with an embodiment of the present invention.

Referring to FIG. 1, a power supply system 51 includes a storage battery (first power storage unit) 1 and a power supply apparatus 6. Power supply apparatus 6 includes a bidirectional DC-DC converter (converter unit) 2, a capacitor (second power storage unit) 3, a step-up circuit 4, a diode (backflow prevention circuit) 5, load-side terminals T1 and T2, and storage battery-side terminals T3 and T4. Bidirectional DC-DC converter 2 includes switch elements 9 and 10, a rector 11, and a capacitor 15. Step-up circuit 4 includes a switch element 12, a rector 13, and a diode 14.

Secondary batteries such as lead-acid batteries, nickel metal hydride batteries, and lithium ion batteries can be used as storage battery (first power storage unit) 1. Here, a lithium ion battery is used and the output voltage is about 3-4V.

Switch elements such as MOS (Metal Oxide Semiconductor) FET (Field Effect Transistor) and IGBT (Insulated Gate Bipolar Transistor) can be used as switch elements 9, 10, 12. Here, MOSFET is used.

The positive terminal of storage battery 1, the first end of reactor 11, and the first end of reactor 13 are connected with storage battery-side terminal T3. The drain of switch element 9 and the source of switch element 10 are connected with the second terminal of reactor 11. The positive terminal of capacitor 15, the cathode of diode 5, and load-side terminal T1 are connected with the drain of switch element 10. The drain of switch element 12 and the anode of diode 4 are connected with the second end of reactor 13. The first end of capacitor 3 and the anode of diode 5 are connected with the cathode of diode 4. Storage battery-side terminal T4, the source of switch element 9, and the source of switch element 12 the second terminal of capacitor 3, the negative terminal of capacitor 15, and load-side terminal. T2 are connected with each other.

The output voltage of storage battery 1 is increased by bidirectional DC-DC converter 2. The output side of bidirectional DC-DC converter 2 is connected to load-side terminals T1 and T2.

Load-side terminals T1 and T2 are connected to a DC load 7. The output voltage of bidirectional DC-DC converter 2 is subjected to constant voltage control so as to fall within a prescribed voltage range in which DC load 7 is operable. Here, the output voltage of bidirectional DC-DC converter 2 is 12V.

When a charger is connected to load-side terminals T1 and T2, bidirectional DC-DC converter 2 performs a voltage conversion operation of decreasing the voltage supplied from the charger through load-side terminals T1 and T2 to an input voltage for storage battery 1.

Step-up circuit 4 is connected to storage battery 1 in parallel with bidirectional DC-DC converter 2. The output of step-up circuit 4 is connected to capacitor 3, Capacitor 3, which is also called, for example, an electric double layer capacitor, is an element in which voltage drop at a time of large current output is smaller than that of storage battery 1 since the capacitance is extremely large. In place of an electric double layer capacitor, a power storage element having a similar function, such as an electrolytic capacitor, can be used.

Step-up circuit 4 is subjected to constant voltage control so that it outputs a voltage slightly lower than the output voltage of bidirectional DC-DC converter 2. More specifically, step-up circuit 4 supplies voltage to capacitor 3 for charging such that the output voltage from capacitor 3 to load-side terminals T1 and T2 is lower than the output voltage of bidirectional DC-DC converter 2. Here, the output voltage of capacitor 3 is 11V.

Diode 5 is connected between capacitor 3 and load-side terminal T1, that is, between capacitor 3 and bidirectional DC-DC converter 2, wherein the direction from capacitor 3 to load-side terminal T1 is the forward direction. In other words, diode 5 is arranged between capacitor 3 and load-side terminal T1 to allow current to flow from capacitor 3 to load-side terminal T1 and block current flowing from load-side terminal T1 to capacitor 3.

[Operation]

An operation of the power supply apparatus in accordance with the embodiment of the present invention will now be described.

Figure 2A:
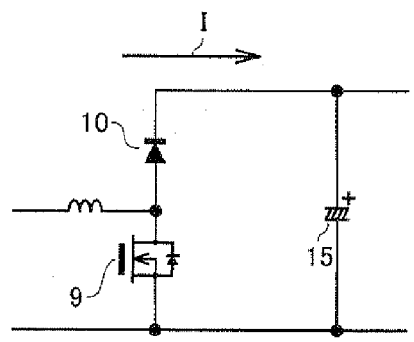
FIG. 2A is a diagram showing an operation in a bidirectional DC-DC converter 2 at a time of discharging of a storage battery 1.
Figure 2B:
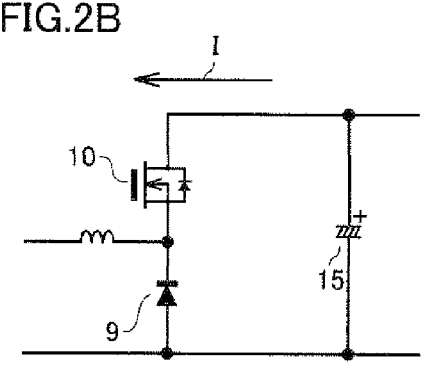
FIG. 2B is a diagram showing an operation in bidirectional DC-DC converter 2 at a time of charging of storage battery 1.
Figure 3:
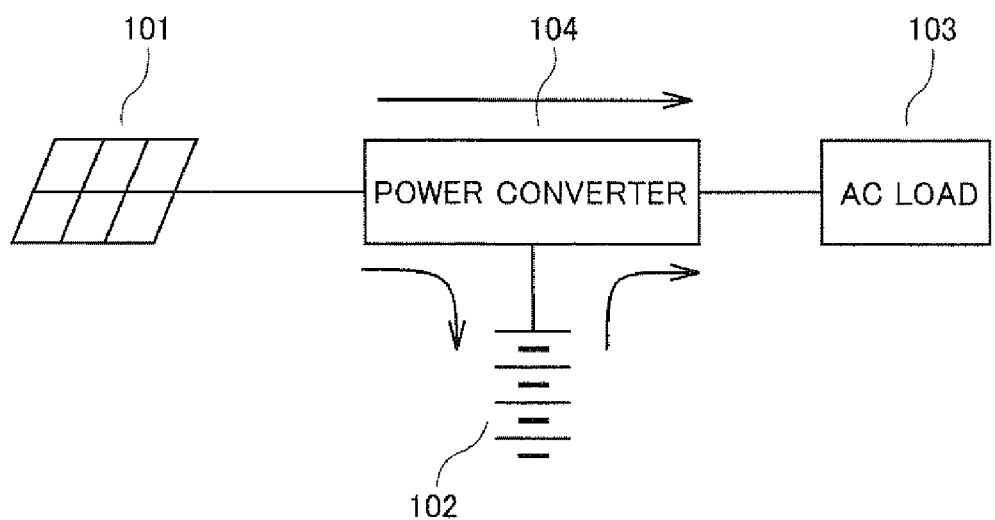
FIG. 3 is a diagram showing a configuration of a conventional interconnection system for a photovoltaic power generation system having a power storage function.

FIG. 2A is a diagram showing an operation in bidirectional DC-DC converter 2 at a time of discharging of storage battery 1. FIG. 2B is a diagram showing an operation in bidirectional DC-DC converter 2 at a time of charging of storage battery 1. The flow of current is represented by 1. In the following, the operation of bidirectional DC-DC converter 2 at a time of discharging of storage battery 1 is referred to as a "forward-direction operation." On the other hand, the operation of bidirectional DC-DC converter 2 at a time of charging of storage battery 1 is referred to as a "reverse-direction operation."

Referring to FIG. 2A, at a time of discharging from storage battery 1, switch element 10 is always controlled in an off state. Therefore, only a body diode included in switch element 10 functions. Furthermore, switch element 9 is switching-controlled at a high frequency of 10 kHz-100 kHz. Therefore, bidirectional DC-DC converter 2 operates as a step-up chopper. Here, the switching frequency is 40 kHz.

Referring to FIG. 2B, at a time of charging to storage battery 1, current from the charger connected to load-side terminals T1 and T2 does not flow toward capacitor 3 and step-up circuit 4 because of diode 5 and thus flows to storage battery 1 through bidirectional DC-DC converter 2. Here, switch element 9 is always controlled in an off state. Therefore, only a body diode included in switch element 9 functions. Furthermore, switch element 10 is switching-controlled at a high frequency. Therefore, bidirectional DC-DC converter 2 functions as a step-down chopper.

Referring to FIG. 1 again, when power supply apparatus 6 is activated, bidirectional DC-DC converter 2 performs a forward-direction operation, and step-up circuit 4 performs a step-up operation. Accordingly, the voltage between load-side terminals T1 and T2 is controlled at 12V, and the output voltage of capacitor 3 is controlled at 11V.

When the consumption current of DC load 7 is small, the output of bidirectional DC-DC converter 2 is maintained at 12V, so that capacitor 3 does not discharge.

On the other hand, when the consumption current of DC load 7 transiently increases, the output voltage of bidirectional DC-DC converter 2 cannot be maintained at 12V in some cases. When the output voltage of bidirectional DC-DC converter 2 falls below 11V, diode 5 disposed between capacitor 3 and load-side terminal T1 is rendered conductive, so that power supply from capacitor 3 to DC load 7 through diode 5 is started. Here, since a voltage drop of capacitor 3 at a time of supply of large current is smaller than that of capacitor 15, the voltage between load-side terminals T1 and T2 does not fall below 11V. Therefore, DC load 7 can continue to operate at a stable voltage even when consumption current changes, and therefore the power supply apparatus in accordance with the embodiment of the present invention can provide a highly-reliable power supply system.

When the consumption current of DC load 7 returns from the transient state to the normal state, the output voltage of capacitor 3 is 11V, and the output voltage of bidirectional DC-DC converter 2 returns from 11V to 12V. Therefore, diode 5 is brought into a non-conducting state, so that current is supplied from storage battery 1 to DC load 7 again only through bidirectional DC-DC converter 2.

In a case where a transient increase of consumption current of DC load 7 as mentioned above continues for a long time and the amount of discharging power from capacitor 3 is large, the output voltage of capacitor 3 may sometimes become lower than 11V, Supposing the output voltage of capacitor 3 is 10V at that moment, when the consumption current of DC load 7 returns from the transient state to the normal state, a charging operation from storage battery 1 to capacitor 3 through step-up circuit 4 is performed, because step-up circuit 4 is operating. In other word, capacitor 3 can be charged so that the output voltage of capacitor 3 returns from 10V to 11V.

When the charger is connected to load-side terminals T1 and T2, bidirectional DC-DC converter 2 performs a reverse-direction operation as mentioned above, so that storage battery 1 is charged through bidirectional DC-DC converter 2.

As described above, in the power supply apparatus in accordance with the embodiment of the present invention, when the consumption current of DC load 7 changes, the shortage current can automatically be supplied from capacitor 3 to DC load 7 without a switching operation of the switch, thereby realizing high reliability.

Here, the configurations disclosed in Patent Documents 1 and 2 cannot supply power to a load operating a voltage higher than the output voltage of the storage battery.

In the power supply apparatus in accordance with the embodiment of the present invention, however, at a time of normal discharging of storage battery 1, power is supplied to a load requiring a voltage higher than the output voltage of storage battery 1, through bidirectional DC-DC converter 2, while capacitor 3 is charged through step-up circuit 4. On the other hand, when the load requires large power, compensation is performed by supplying power from capacitor 3 in addition to the output form bidirectional DC-DC converter 2, so that the load can be operated stably without a large drop of voltage between load-side terminals T1 and T2.

In other words, in the power supply apparatus in accordance with the embodiment of the present invention, even when the load connected to the power supply apparatus operates at a voltage higher than the output voltage of the storage battery and requires large current, a stable output voltage can be supplied, thereby realizing high reliability.

The apparatuses disclosed in Patent Documents 1 and 2 both include a resistor for current limiting, and it is necessary to use a resistor with a large power capacity so that heat generation does not become excessive when current flows through the resistor. Accordingly, the component costs are inevitably increased.

The power supply apparatus in accordance with the embodiment of the present invention, however, includes step-up circuit 4. Step-up circuit 4 limits the current from storage battery 1 to capacitor 3. Therefore, in the power supply apparatus in accordance with the embodiment of the present invention, it is no longer necessary to use a resistor for current limiting, thereby reducing the costs for components and the like for preventing power loss and heat generation in a resistor.

The embodiment disclosed here should be understood as being illustrative rather than limiting in all respects. The scope of the present invention is shown not by the foregoing description but by the claims, and it is intended that the equivalency to the claims and all the modifications within the claims should be embraced here.

The invention claimed is:

1. A power supply apparatus converting electric power stored in a first power storage unit into a prescribed voltage for supply to a load comprising:
   a power storage unit-side terminal coupled to said first power storage unit;
   a second power storage unit;
   a load-side terminal coupled to said load;
   a converter unit for increasing output voltage of said first power storage unit to a first voltage and outputting said first voltage to said load-side terminal at a time of discharging of said first power storage unit;
   a step-up circuit for increasing output voltage of said first power storage unit and supplying said increased voltage to said second power storage unit; and
   a backflow prevention circuit arranged between said second power storage unit and said load-side terminal to allow current to flow from said second power storage unit to said load-side terminal and block current flowing from said load-side terminal to said second power storage unit.

2. The power supply apparatus according to claim 1, wherein said step-up circuit increases output voltage of said first power storage unit and supplies said increased voltage to said second power storage unit such that output voltage of said second power storage unit is smaller than said first voltage.

3. The power supply apparatus according to claim 1, wherein said backflow prevention circuit includes a diode having an anode coupled to said second power storage unit and a cathode coupled to said load-side terminal.

4. The power supply apparatus according to claim 1, wherein said converter unit decreases voltage supplied from said load-side terminal and supplies said decreased voltage to said first power storage unit at a time of charging of said first power storage unit.

5. The power supply apparatus according to claim 1, wherein said first power storage unit is a storage battery, and said second power storage unit is a capacitor.

6. A power supply system supplying electric power to a load comprising:
   a first power storage unit;
   a second power storage unit;
   a load-side terminal coupled to said load;
   a converter unit for increasing output voltage of said first power storage unit to a first voltage and outputting said first voltage to said load-side terminal at a time of discharging of said first power storage unit;
   a step-up circuit for increasing output voltage of said first power storage unit and supplying said increased voltage to said second power storage unit; and
   a backflow prevention circuit arranged between said second power storage unit and said load-side terminal to allow current to flow from said second power storage unit to said load-side terminal and block current flowing from said load-side terminal to said second power storage unit.

* * * * *